United States Patent Office 3,329,630
Patented July 4, 1967

3,329,630
1,2-ALKYLENE OXIDE POLYMERIZATION USING ZINC HYDRIDE CATALYST
Stephen S. Hirsch, Forest Heights, Md., assignor to The Goodyear Tire & Rubber Company, Akron, Ohio, a corporation of Ohio
No Drawing. Filed Dec. 10, 1963, Ser. No. 329,378
7 Claims. (Cl. 260—2)

ABSTRACT OF THE DISCLOSURE $ZnH_2$ is an effective catalyst for homo- and co-polymerization of 1,2-alkylene oxides (up to 12 C) when employed in amounts between about 0.01 to 10.0% by weight. Bulk polymerization is initiated at —50 to —100° C. to prevent catalyst decomposition and thereafter conducted (as with soln. or suspension polymerization at 50 to 80° C. Elastomeric polymers result. Propylene oxide (80–98 wt. percent) and allyl glycidyl ether (20–2 wt. percent) are preferred reactants.

---

This invention relates to a novel process for polymerizing alkylene oxides and to the novel catalyst employed.

Alkylene oxides, especially the lower 1,2-alkylene oxides containing up to 12 carbon atoms, are known to polymerize to produce desirable rubbery polymers and copolymers suitable for use in the fabrication of tires, belting, containers and other useful products.

A variety of catalysts are known to be capable of polymerizing alkylene oxides to produce such useful polymers. Among these known catalysts are metal halides, metal halide-alkylene oxide complexes, metal alkoxides and alkaline earth metal carbonates. More recently it has been disclosed that metal dialkyl compounds in combination with water (or oxygen, or organic alcohols) are suitable catalysts for polymerizing alkylene oxides to produce high molecular weight polymers. In view of the increasing availability of economically desirable alkylene oxide monomers, it has become desirable to discover novel and useful catalyst systems which will efficiently polymerize such monomers. Many of the existing catalyst systems are expensive to prepare and difficult or dangerous to store and employ.

Accordingly it is an object of this invention to discover a new and useful catalyst system to polymerize the lower 1,2-alkylene oxides to produce high molecular weight homopolymers, copolymers and terpolymers. This and other objects will become readily apparent through the teachings of this specification.

PRESENT INVENTION

It has now been found that the lower 1,2-alkylene oxides may be polymerized by a process which comprises mixing at least one such alkylene oxide with a catalytic amount of zinc hydride in an inert atmosphere until a polymer is formed.

Monomers which may be usefully polymerized according to this process are compounds broadly characterized as 1,2-alkylene oxides which have the general formula

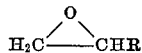

In this formula R represents hydrogen or an alkyl radical containing up to 10 carbon atoms. Examples of such monomers are: ethylene oxide, propylene oxide, 1-butene oxide, 1-pentene oxide, etc. up to and including 1-dodecene oxide. These monomers may be polymerized as homopolymers, or mixed to form copolymers or terpolymers. If desired, minor amounts, e.g. up to about 20% by weight, of a 1,2-alkylene oxide containing ethylenic unsaturation in the pendant radical (R of the general formula supra) may be included in the monomer mix to produce a copolymer or terpolymer which can be vulcanized. A suitable and convenient monomer for this latter purpose is allyl glycidyl ether although persons skilled in the art will be aware of other well known equivalents. Vulcanization can be accomplished by conventional techniques well understood in the elastomer art. The term vulcanization is to be understood as including cross linking by oxygen and peroxides as well as the conventional sulfur cross linking cure.

CATALYST

The novel catalyst which is useful for polymerizing 1,2-alkylene oxide monomers is zinc hydride. Zinc hydride may be prepared according to a procedure outlined in the "Journal of the American Chemical Society" October 1951, page 4585 in an article entitled "Preparation of Zinc, Cadmium, Beryllium, Magnesium and Lithium Hydride" by Barbaras, Dillard, Finholt, Wartik, Welzbach, and Schlesinger. It may also be prepared by the reaction of zinc iodide with lithium aluminum hydride in a diethyl-ether solution. The reaction is believed to proceed in accordance with the following formula:

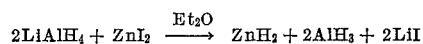

The details of this preparation technique are disclosed in Example 1 infra.

In practicing this invention the amount of catalyst used is not critical and amounts ranging from about 0.01 to 10 percent by weight of zinc hydride to weight of monomer or monomers may be employed. In the interest of convenience and economy of materials and time, it has been found that desirable polymerization results may be achieved when employing between 1 and 5 percent catalyst by weight.

POLYMERIZATION AND RECOVERY

The polymerization of alkylene oxides employing this novel catalyst may be conducted either in bulk or in an inert solvent or suspension medium. When conducted in bulk with the alkylene oxide being added directly to the zinc hydride, the initial heat of reaction causes the remaining hydride to decompose vigorously into its constituent elements. It is desirable, therefore, to conduct this bulk polymerization in an inert atmosphere and preferably also at low temperatures. For this purpose any inert gas such as nitrogen, argon or helium is suitable.

The first additions of propylene oxide to zinc hydride should be done at temperatures of —50 to —100° C. so as to minimize catalyst decomposition. The polymerization mixture can then be permitted to warm to any desired polymerization temperature, the desired range being 50 to 80° C.

The reaction may also be advantageously conducted in a solution or suspension. For this purpose any inert organic solvent such as aromatic, cycloaliphatic or aliphatic hydrocarbons and the like may be employed. Examples of materials suitable for this purpose are: benzene, cyclohexane, heptane, hexane, diethyl ether, tetrahydrofuran and the like. When conducted in solution, the reaction will proceed at room temperature and, although the temperature is not critical, it has been found that better results are achieved by elevating the temperature somewhat. 50 to 80° C. is a desirable temperature range.

The polymers, copolymers and terpolymers which are produced by the practice of this invention are suitably employed as a general purpose rubber. They can be used in the fabrication of tires; mechanical goods, such as belting and seals; and insulation. It is a particularly desirable rubber because of its superior age resistance and high temperature properties. It is also outstanding in resistance to failure by flexing and tearing.

The following examples further illustrate the invention but are not to be construed as limiting it thereto.

*Example 1.—Zinc hydride catalyst preparation*

15 grams of lithium aluminum hydride ($LiAlH_4$) was stirred with 350 ml. of anhydrous ethyl ether for 6 hours at room temperature. Agitation was ceased and after settling the clear liquid removed by means of a syringe.

The titer of this ether solution of $LiAlH_4$ was determined by the method of H. Felkin—Bull: Soc. Chem. France (1951) p. 347, with the exception that greater caution was employed so as to exclude moisture. It has a titer of .0456 g./ml.

9 grams of zinc iodide ($ZnI_2$) which had been thoroughly dried over $P_2O_5$ was dissolved in 625 ml. of ethyl ether. This solution is amber in color.

After cooling to $-40°$ C. the entire $ZnI_2$ solution was added to 63 ml. of the above $LiAlH_4$ solution which was also cooled to $-40°$ C. The white precipitate of zinc hydride ($ZnH_2$) formed at once. It was filtered, washed with ether and dried. After drying the $ZnH_2$ was stored at $-30°$ C.

*Example 2.—Homopolymer preparation*

Propylene oxide was purified and dried by means of molecular sieves. Zinc hydride was ground to a fine powder and 35.1 mg. was placed in a thoroughly dried 4-oz. bottle and cooled to $-80°$ C. 42.0 ml. of the propylene oxide was dropped directly onto the zinc hydride while maintaining the temperature at $-80°$ C. The mixture was permitted to warm to room temperature whereupon 5.0 ml. additional of propylene oxide was added. The reaction later was sealed, placed in a 50° C. water bath and agitated for 24 hours.

The reaction mixture was completely solid at the end of the 24-hour period. The bottle was separated from the polymer cement and the cement agitated with a large excess of water. The polymer precipitated and after several washings it was dried in a vacuum oven at 50° C. The polymer had a dilute solution viscosity of 5.0 (0.05 gm. polymer/100 cc. benzene $-30°$ C.).

Having provided a complete description of the invention in such manner as to distinguish it from other inventions and from what is old and having provided a description of the best mode contemplated of carrying out the invention, the scope of patent protection to be granted the invention is defined in the following claims.

What is claimed is:

1. A process for polymerizing 1,2-alkylene oxides which comprises mixing at a temperature between $-100°$ C. and 80° C. at least one such alkylene oxide with a catalytic amount of zinc hydride in an inert atmosphere until a polymer is formed.

2. The process of polymerizing 1,2-alkylene oxides which comprises adding at least one such alkylene oxide monomer to a solution of zinc hydride in an inert organic solvent and maintaining said mixture at a temperature between 50° C. and 80° C. until a polymer is formed.

3. The process according to claim 1 wherein the alkylene oxide contains from 2 to 12 carbon atoms.

4. The process according to claim 1 wherein the alkylene oxide is primarily propylene oxide.

5. The process according to claim 1 wherein the monomers comprise a mixture in which there is up to 20% of an alkylene oxide containing an ethylenic unsaturated hydrocarbon radical.

6. The process according to claim 5 wherein the alkylene oxide containing an ethylenic unsaturated hydrocarbon radical is allyl glycidyl ether.

7. The process according to claim 2 wherein the monomers comprise a mixture in which there is up to 20% of an alkylene oxide containing an ethylenically unsaturated hydrocarbon radical.

No references cited.

WILLIAM H. SHORT, *Primary Examiner.*

T. PERTILLA, *Assistant Examiner.*